(12) United States Patent
Hayama (10) Patent No.: US 9,126,618 B2
(45) Date of Patent: Sep. 8, 2015

(54) VEHICLE STEERING SYSTEM

(71) Applicant: JTEKT CORPORATION, Osaka-shi, Osaka (JP)

(72) Inventor: Ryouhei Hayama, Nabari (JP)

(73) Assignee: JTEKT CORPORATION, Osaka (JP)

( * ) Notice: Subject to any disclaimer, the term of this patent is extended or adjusted under 35 U.S.C. 154(b) by 292 days.

(21) Appl. No.: 13/826,131

(22) Filed: Mar. 14, 2013

(65) Prior Publication Data

US 2013/0253771 A1    Sep. 26, 2013

(30) Foreign Application Priority Data

Mar. 22, 2012  (JP) ................................ 2012-065678

(51) Int. Cl.
*B62D 5/00*    (2006.01)
(52) U.S. Cl.
CPC ................ *B62D 5/003* (2013.01); *B62D 5/001* (2013.01)
(58) Field of Classification Search
None
See application file for complete search history.

(56) References Cited

U.S. PATENT DOCUMENTS

| 6,079,513 A | 6/2000 | Nishizaki et al. |
| 7,664,584 B2 * | 2/2010 | Chino et al. ..................... 701/41 |
| 2003/0146038 A1 * | 8/2003 | Mills et al. ..................... 180/422 |
| 2013/0161118 A1 * | 6/2013 | Yoshimoto ..................... 180/446 |

FOREIGN PATENT DOCUMENTS

| DE | 195 10 717 A1 | 9/1996 |
| DE | 198 05 383 A1 | 8/1998 |
| EP | 1 279 586 A2 | 1/2003 |
| EP | 2 610 132 A1 | 7/2013 |
| JP | A-10-278826 | 10/1998 |
| JP | A-2004-90784 | 3/2004 |

OTHER PUBLICATIONS

Extended European Search Report issued in European Patent Application No. 13160232.8 dated Aug. 21, 2013.

* cited by examiner

*Primary Examiner* — Rami Khatib
(74) *Attorney, Agent, or Firm* — Oliff PLC (57) ABSTRACT

A vehicle steering system, in which a steering member and steered wheels are not mechanically coupled to each other, includes a rotation angle restriction mechanism that restricts a rotation angle of the steering member within a restricted angular range. In a failure mode, that is, in a case where a malfunction occurs in a steering angle sensor, a steering direction is detected on the basis of a strain of the rotation angle restriction mechanism, which is detected by one of strain gauges at a corresponding one of a pair of terminal ends of a restricted angular range. Drive control is executed on a steered system actuator on the basis of the detected steering direction.

6 Claims, 10 Drawing Sheets

VEHICLE STEERING SYSTEM

INCORPORATION BY REFERENCE/RELATED APPLICATION

This application claims priority to Japanese Patent Application No. 2012-065678 filed on Mar. 22, 2012 the disclosure of which, including the specification, drawings and abstract, is incorporated herein by reference in its entirety.

BACKGROUND OF THE INVENTION

1. Field of the Invention
The invention relates to a vehicle steering system.
2. Discussion of Background
Japanese Patent Application Publication No. 10-278826 (JP 10-278826 A) describes a so-called steer-by-wire steering system in which a steering member and steered wheels are not mechanically coupled to each other. JP 10-278826 A suggests that there are provided a main steering angle sensor and a backup steering angle sensor that is used in place of the main steering angle sensor in the event of a failure of the main steering angle sensor. In addition, Japanese Patent Application Publication No. 2004-90784 (JP 2004-90784 A) describes a steer-by-wire steering system in which a planetary gear mechanism is arranged between a steering member and a steered mechanism. JP 2004-90784 A suggests that, in the event of a failure of a steering angle sensor, rotation of a ring gear of the planetary gear mechanism is restrained to allow manual steering via the planetary gear mechanism of which the gear ratio has been fixed through the restraint of the rotation of the ring gear.

According to JP 10-278826 A, the multiple expensive steering angle sensors are used, which increases the manufacturing cost. According to JP 2004-90784 A, the planetary gear mechanism is used, which also increases the manufacturing cost.

SUMMARY OF THE INVENTION

The invention provides a vehicle steering system that is able to detect a steering direction with a low-cost configuration, in the event of a malfunction in a steering angle sensor.

According to a feature of an example of the invention, in a vehicle steering system in which a steering member and a steered wheel are not mechanically coupled to each other, there are provided: a steering angle sensor that detects a steering angle of the steering member; a steering direction detection unit that detects only a steering direction of the steering member; a steered system actuator that drives the steered wheel; a rotation angle restriction mechanism that restricts a rotation angle of the steering member within a restricted angular range; and a control unit that has a normal mode in which drive control is executed on the steered system actuator on the basis of the steering angle detected by the steering angle sensor and a failure mode in which, when there is a malfunction in the steering angle sensor, drive control is executed on the steered system actuator on the basis of the steering direction detected by the steering direction detection unit, and the steering direction detection unit includes a strain gauge that detects the steering direction by detecting a strain that occurs in the rotation angle restriction mechanism at any one of a pair of terminal ends of the restricted angular range.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 2 is a sectional view of a housing that accommodates a reaction motor, a rotation angle restriction mechanism that restricts the rotation angle of a steering member, and the like;

FIG. 11A and FIG. 11B are front views of one of endmost plate elements and an end wall that serves as a non-rotatable element, wherein FIG. 11A shows a state where a protrusion is engaged with one of restricting portions in a recess, and FIG. 11B shows a state where the protrusion is engaged with the other one of the restricting portions in the recess; and FIG. 12A to FIG. 12C are schematic front views of one of endmost plate elements and an end wall that serves as a non-rotatable element according to another embodiment of the invention, wherein FIG. 12A shows a state where rotation of the one of the endmost plate elements is not restricted, FIG. 12B shows a state where one of restricted portions on the outer periphery of the one of the endmost plate elements is engaged with one of restricting portions of an annular recess, and FIG. 12C shows a state where the other one of the restricted portions on the outer periphery of the one of the endmost plate elements is engaged with the other one of the restricting portions of the annular recess.

DETAILED DESCRIPTION OF EMBODIMENTS

Hereinafter, embodiments of the invention will be described with reference to the accompanying drawings.

Figure 1:
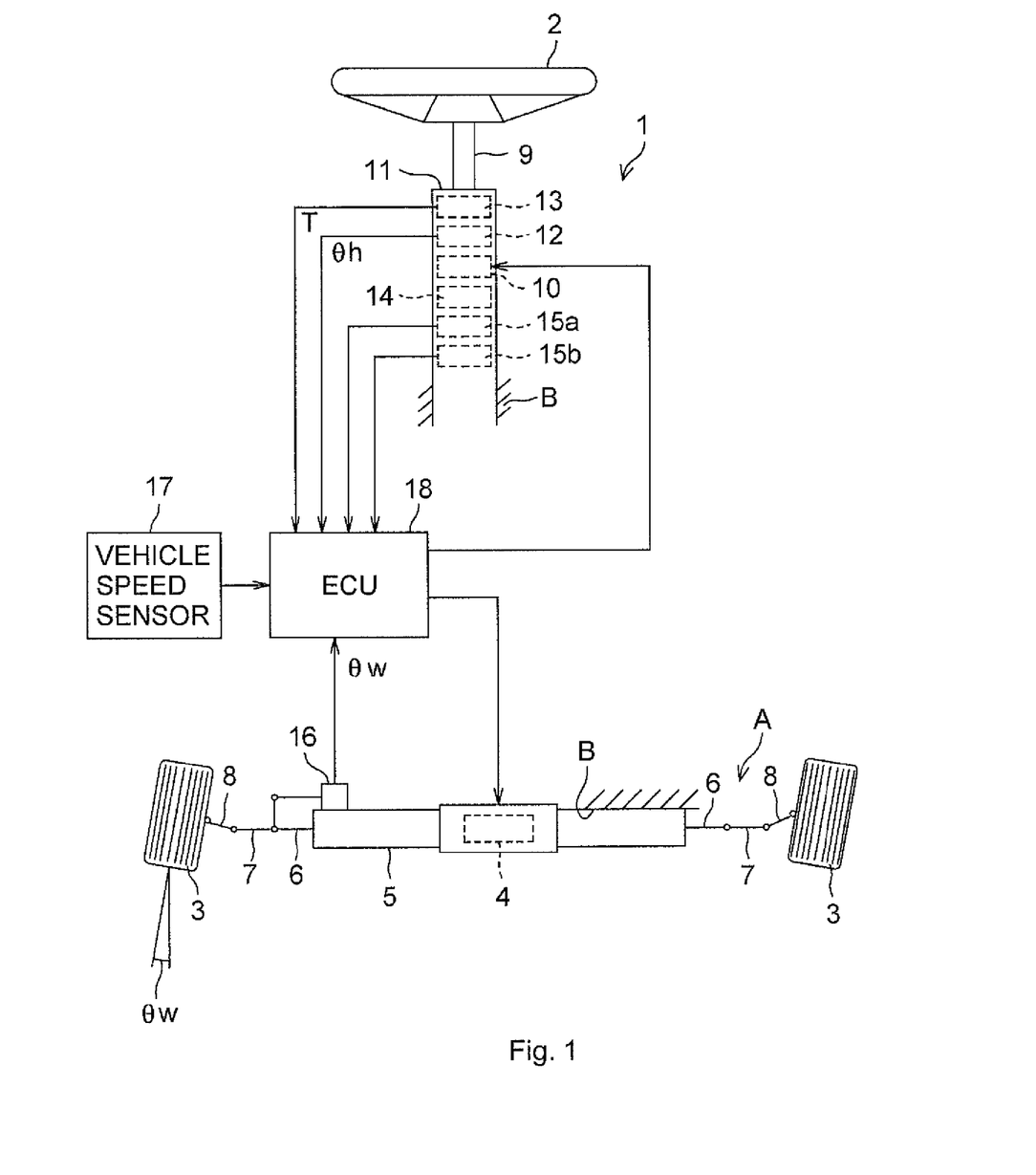
FIG. 1 is a schematic view that shows the schematic configuration of a vehicle steering system according to an embodiment of the invention.

FIG. 1 is a schematic view that shows the schematic configuration of a vehicle steering system according to an embodiment of the invention. As shown in FIG. 1, the vehicle steering system 1 constitutes a so-called steer-by-wire system in which a steering member 2, such as a steering wheel, which is operated in multiple rotations, is not mechanically coupled to steered wheels 3.

In the vehicle steering system 1, an operation of a steered system actuator 4 that is driven in response to a rotating operation of the steering member 2 is converted into a linear motion of a steered shaft 6 in the vehicle-width direction. The steered shaft 6 is supported by a housing 5. The linear motion of the steered shaft 6 is converted into steered motions of the right and left steered wheels 3. Thus, a vehicle is steered. The position of the steering member 2, which corresponds to the position of the steered wheels 3 at the time when the vehicle is travelling straight ahead, is set as a steering neutral position.

The steered system actuator 4 includes, for example, an electric motor. The driving force of the electric motor (the rotational force of an output shaft) is converted into an axial linear motion of the steered shaft 6 by a ball screw mechanism provided for the steered shaft 6. The linear motion of the steered shaft 6 is transmitted to tie rods 7 coupled to respective ends of the steered shaft 6, and causes the pivot motions of knuckle arms 8. Thus, the steered wheels 3 supported by the knuckle arms 8 are steered.

The steered shaft 6, the tie rods 7 and the knuckle arms 8 constitute a steered mechanism A used to steer the steered wheels 3. The housing 5 that supports the steered shaft 6 is fixed to a vehicle body B. The steering member 2 is coupled to a steering shaft 9 that is rotatably supported by the vehicle body B. A reaction motor 10 is fitted to the steering shaft 9. The reaction motor 10 is used to apply reaction force, which is transmitted from a road surface, or the like, to the steered wheels 3, to the steering member 2 as steering reaction force. The reaction motor 10 includes an electric motor, such as a brushless motor. The reaction motor 10 is accommodated in a housing 11 that is fixed to the vehicle body B.

The vehicle steering system 1 includes a steering angle sensor 12 provided on the steering shaft 9. The steering angle sensor 12 is used to detect a steering angle Oh of the steering member 2. A torque sensor 13 is provided on the steering shaft 9. The torque sensor 13 is used to detect a steering torque T applied to the steering member 2.

The steering angle sensor 12 and the torque sensor 13 are accommodated in the housing 11. In addition, a rotation angle restriction mechanism 14 and a pair of strain gauges 15a, 15b are accommodated in the housing 11. The rotation angle restriction mechanism 14 restricts the rotation angle of the steering member 2. The strain gauges 15a, 15b serve as a steering direction detection unit that detects only a steering direction.

The rotation angle restriction mechanism 14 has the function of restricting the rotation angle of an output shaft 24 of the steering shaft 9 within a restricted angular range. The steering shaft 9 serves as a rotary shaft of the steering member 2 that is rotationally operated. In the steer-by-wire vehicle steering system 1 in the present embodiment, the steering member 2 is not subjected to restrictions from the steered mechanism A. Therefore, in order to prevent the steering member 2 from being operated beyond an operation limit of the steered mechanism A, the rotation angle restriction mechanism 14 restricts the rotation angle of the steering member 2 within the restricted angular range that corresponds to the operation limit.

In the event of a failure, that is, when there is a malfunction in the steering angle sensor 12, the strain gauges 15a, 15b detect the steering direction of the steering member 2 by detecting a strain of the rotation angle restriction mechanism 14 at one of the terminal ends of the restricted angular range of the rotation angle restriction mechanism 14. In addition, the vehicle steering system 1 includes a steered angle sensor 16 at the steered shaft 6. The steered angle sensor 16 is used to detect a steered angle Ow (tire angle) of the steered wheels 3. In addition to these sensors, a vehicle speed sensor 17 that detects a vehicle speed V is provided. Detection signals from these sensors 12, 13, 15 to 17 are input into an electronic control unit (ECU) 18 that serves as a control unit that includes a microcomputer.

The ECU 18 sets a target steered angle on the basis of the steering angle Oh detected by the steering angle sensor 12 and the vehicle speed V detected by the vehicle speed sensor 17. The ECU 18 executes drive control (steered operation control) on the steered system actuator 4 via a drive circuit (not shown) incorporated in the ECU 18, on the basis of a deviation between the target steered angle and the steered angle δw detected by the steered angle sensor 16.

In addition, the ECU 18 executes drive control (reaction control) on the reaction motor 10 via the drive circuit (not shown) incorporated in the ECU 18 such that an appropriate reaction force in a direction opposite to the direction in which the steering member 2 is steered is applied to the steering member 2 on the basis of the detection signals output from the sensors 12, 13, 15 to 17.

Figure 2:
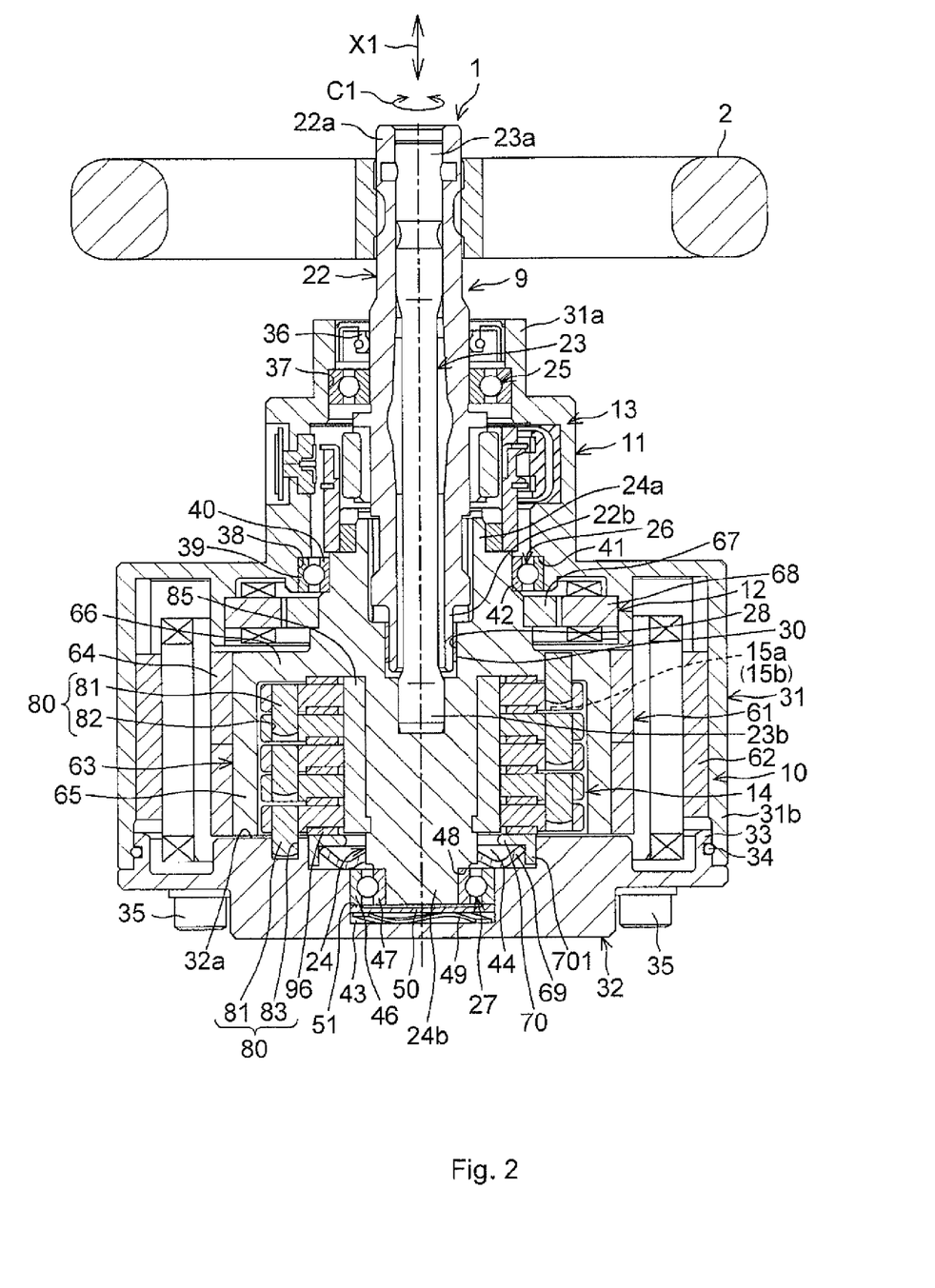

As shown in FIG. 2, the steering shaft 9 is rotatably supported by the tubular housing 11. One end of the steering shaft 9 protrudes from the housing 11, and the steering member 2 is coupled to the one end so as to be rotatable together with the steering shaft 9. The steering angle sensor 12, the torque sensor 13 and the reaction motor 10 are accommodated in the housing 11.

The steering shaft 9 includes an input shaft 22 and the output shaft 24. The steering member 2 is coupled to one end 22a of the input shaft 22 (which corresponds to the above-described one end of the steering shaft 9) so as to be rotatable together with the input shaft 22. The output shaft 24 is coaxially coupled to the input shaft 22 via a torsion bar 23 such that torque is transmittable between the input shaft 22 and the output shaft 24. One end 23a of the torsion bar 23 is coupled to the input shaft 22 so as to be rotatable together with the input shaft 22. The other end 23b of the torsion bar 23 is coupled to the output shaft 24 so as to be rotatable together with the output shaft 24.

The steering shaft 9 is rotatably supported by a first bearing 25, a second bearing 26 and a third bearing 27 that are retained by the housing 11. The first bearing 25 supports an axially intermediate portion of the input shaft 22 such that the input shaft 22 is rotatable. The second bearing 26 and the third bearing 27 support the output shaft 24 such that the output shaft 24 is rotatable. Specifically, the second bearing 26 supports a portion of the output shaft 24, which is near one end 24a of the output shaft 24, such that the output shaft 24 is rotatable, and the third bearing 27 supports the other end 24b of the output shaft 24 such that the output shaft 24 is rotatable.

The other end 22b of the input shaft 22 is inserted into a support hole 28 formed in the output shaft 24. The other end 22b of the input shaft 22 is rotatably supported by the inner periphery of the output shaft 24, which defines the support hole 28, via a fourth bearing 30.

The housing 11 is formed by assembling a housing body 31 and an end wall 32 together. The housing body 31 has a tubular shape, and has one end 31a and the other end 31b. The end wall 32 that is part of the housing 11 has a generally plate shape, and closes the other end 31b of the housing body 31.

Specifically, the end wall 32 has a tubular portion 33 that protrudes in the axial direction from a portion of the end wall 32, which is near the radially outer portion of the end wall 32, and the tubular portion 33 is fitted to the inner periphery of the other end 3 1b of the housing body 31. An O-ring 34 is accommodated in an accommodation groove formed in the outer periphery of the tubular portion 33. The sealing performance at a joint between the housing body 31 and the tubular portion 33 is ensured by the O-ring 34. The end wall 32 is fixed to the other end 3 1b of the housing body 31 with, for example, fixing screws 35.

The end wall 32 and a pressing plate 70 (described later) constitute a non-rotatable element (described later) of the rotation angle restriction mechanism 14. The end wall 32 is part of the housing 11. The rotation of the pressing plate 70 is restricted by the end wall 32 via an urging member 69 (described later). An oil seal 36 is interposed between the inner periphery of the one end 31a of the housing body 31 and the outer periphery of the input shaft 22 of the steering shaft 9, and seals a gap therebetween. The first bearing 25 is retained by a bearing retaining portion 37 formed in the inner periphery of the one end 31a of the housing body 31.

The second bearing 26 is retained by a bearing retaining portion 38 formed in an axially intermediate portion of the housing body 31, and supports the outer periphery of a portion of the output shaft 24, which is near the one end 24a of the output shaft 24, such that the output shaft 24 is rotatable. The second bearing 26 includes an outer ring 39 and an inner ring 40. The outer ring 39 is fixedly fitted to the bearing retaining portion 38. The inner ring 40 is fitted to the outer periphery of the output shaft 24 so as to be rotatable together with the output shaft 24.

One end face of the outer ring 39 of the second bearing 26 contacts a positioning step 41 formed at one end of the bearing retaining portion 38 of the housing body 31. This restricts movement of the outer ring 39 toward one side (toward the first bearing 25) in an axial direction X1 of the output shaft 24. One end face of the inner ring 40 of the second bearing 26 contacts a positioning step 42 formed in the outer periphery of the output shaft 24. This restricts movement of the inner ring 40 toward the other side (toward the third bearing 27) in the axial direction X1 of the output shaft 24.

A circular center recess 43 and an annular recess 44 are formed in an inner wall face 32a of the end wall 32. The center recess 43 serves as a first recess. The annular recess 44 surrounds the center recess 43 and serves as a second recess. The depth of the center recess 43 is larger than the depth of the annular recess 44. The other end 24b of the output shaft 24 is inserted into the center recess 43. The third bearing 27 is retained by the inner periphery of the end wall 32, which defines the center recess 43, and supports the other end 24b of the output shaft 24 such that the output shaft 24 is rotatable.

The third bearing 27 includes an outer ring 46 and an inner ring 47. The outer ring 46 is loosely fitted to the inner periphery of the end wall 32, which defines the center recess 43, so as to be axially movable. The inner ring 47 is fitted to the outer periphery of the other end 24b of the output shaft 24 so as to be rotatable together with the output shaft 24. One end face of the inner ring 47 of the third bearing 27 contacts a positioning step 48 formed in the outer periphery of the output shaft 24. This restricts movement of the inner ring 47 toward the one side (toward the second bearing 26) in the axial direction X1 of the output shaft 24.

An elastic member 49 and a spacer 50 are accommodated in the center recess 43. The elastic member 49 is formed of a wave washer, and collectively applies an axial preload to the second bearing 26 and the third bearing 27. The spacer 50 serves as a preload application member, and is interposed between the elastic member 49 and the third bearing 27. The spacer 50 is formed of a circular plate or an annular plate as shown in FIG. 2. The spacer 50 has an annular protrusion 51 such that the spacer 50 contacts neither the end face of the other end 24b of the output shaft 24 nor the end face of the inner ring 47 of the third bearing 27 and contacts only the end face of the outer ring 46. The elastic member 49 urges the outer ring 46 of the third bearing 27 via the annular protrusion 51 of the spacer 50 toward the one side in the axial direction X1 of the output shaft 24.

The urging force is received by the positioning step 41 of the housing body 31 via the outer ring 46 of the third bearing 27, the inner ring 47 of the third bearing 27, the positioning step 48 of the output shaft 24, the positioning step 42 of the output shaft 24, the inner ring 40 of the second bearing 26 and the outer ring 39 of the second bearing 26. Thus, it is possible to collectively apply an axial preload to the second bearing 26 and the third bearing 27.

The torque sensor 13 is arranged between the first bearing 25 and the second bearing 26 in the housing 11. The torque sensor 13 may be, for example, a torque sensor that uses a Hall IC (magnetic sensor). The ECU 18 is configured to calculate a steering torque input into the steering shaft 9 on the basis of a signal from the torque sensor 13.

The reaction motor 10 includes a rotor 61 and a stator 62. The rotor 61 is coupled to the output shaft 24 so as to be rotatable together with the output shaft 24. The stator 62 concentrically surrounds the rotor 61, and is fixed to the inner periphery of the housing body 31. The rotor 61 includes a rotor core 63 and a permanent magnet 64. The rotor core 63 is rotatable together with the output shaft 24. The permanent magnet 64 is coupled to the rotor core 63 so as to be rotatable together with the rotor core 63.

The rotor core 63 has a tubular first portion 65 and a second portion 66. The first portion 65 concentrically surrounds the output shaft 24. The second portion 66 is coupled to the output shaft 24 so as to be rotatable together with the output shaft 24. The permanent magnet 64 is coupled to the outer periphery of the first portion 65 so as to be rotatable together with the first portion 65. The second portion 66 constitutes a rotatable element (described later) of the rotation angle restriction mechanism 14.

In the present embodiment, description is made on an example in which the rotor core 63 that has the first portion 65 and the second portion 66 is formed integrally with the output shaft 24 from a single material. Alternatively, a rotor core formed separately from the output shaft 24 may be fixedly coupled to the output shaft 24.

In the housing 11, the steering angle sensor 12 is arranged between the second portion 66 and the second bearing 26. The steering angle sensor 12 is formed of, for example, a resolver. The steering angle sensor 12 includes a resolver rotor 67 and a resolver stator 68. The resolver rotor 67 is coupled to the output shaft 24 so as to be rotatable together with the output shaft 24. The resolver stator 68 is fixed to the inner periphery of the housing body 31, and surrounds the resolver rotor 67.

Figure 3:
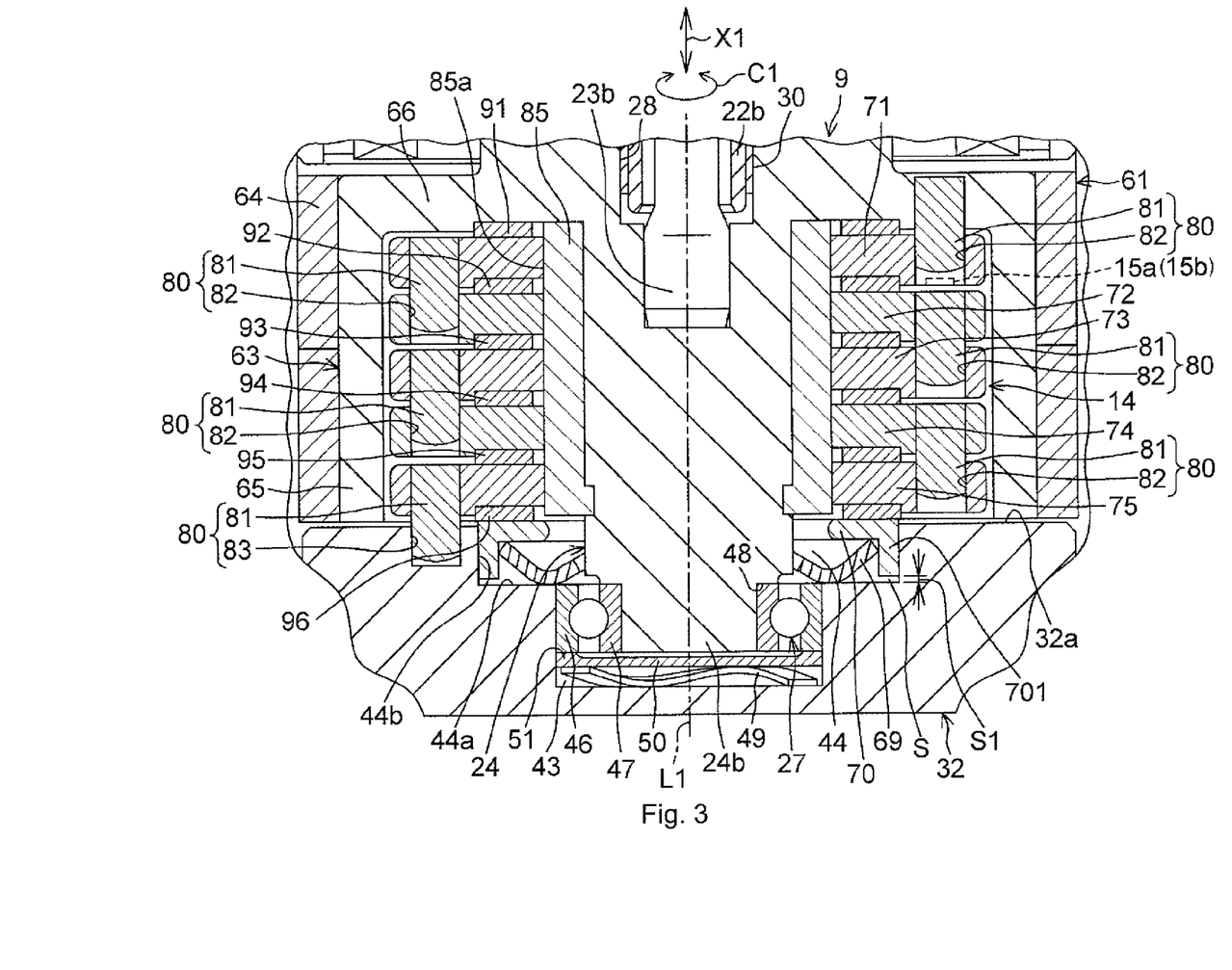
FIG. 3 is a partially enlarged sectional view of the rotation angle restriction mechanism and its surroundings in FIG. 2.
Figure 4:
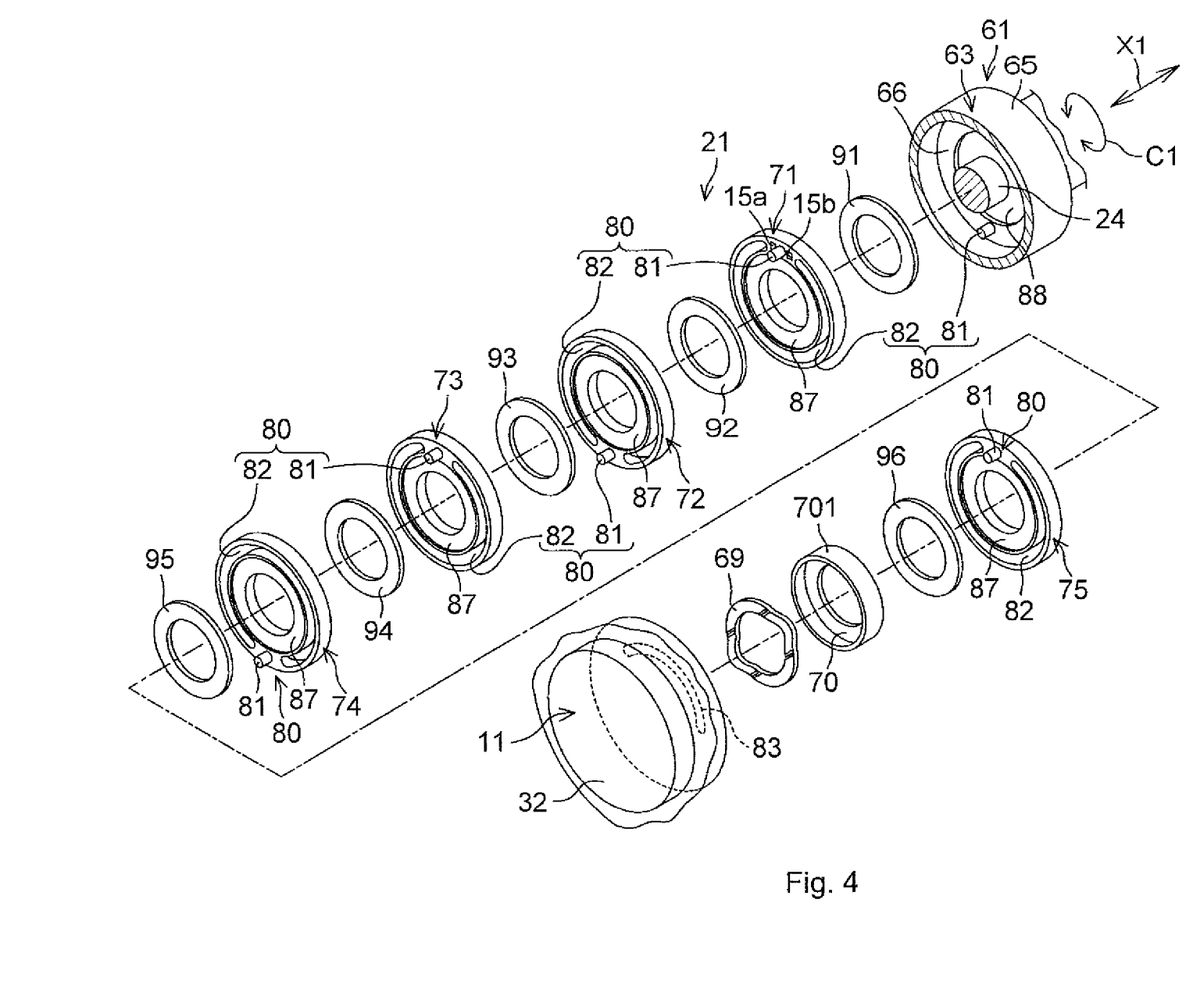
FIG. 4 is an exploded perspective view of the rotation angle restriction mechanism.

FIG. 3 is a partially enlarged sectional view of the rotation angle restriction mechanism 14 and its surroundings in FIG. 2. Almost all the elements of the rotation angle restriction mechanism 14 are arranged in a space on the radially inner side of the first portion 65 of the rotor core 63 of the rotor 61. As shown in FIG. 3 and FIG. 4 that is an exploded perspective view, the rotation angle restriction mechanism 14 includes the end wall 32 of the housing 11, a plurality of plate elements 71 to 75 and the second portion 66 of the rotor core 63. The end wall 32 of the housing 11 serves as the non-rotatable element. The plate elements 71 to 75 are coaxially supported by the output shaft 24 of the steering shaft 9 that serves as the rotary shaft of the steering member 2. The plate elements 71 to 75 are rotatable with respect to the output shaft 24 and are movable in the axial direction X1. The second portion 66 of the rotor core 63 serves as the rotatable element. The end wall 32 that serves as the non-rotatable element and the second portion 66 that serves as the rotatable element are arranged on respective sides of the plate elements 71 to 75 in the axial direction Xl.

The rotation angle restriction mechanism 14 includes a plurality of coupling elements 80 that couple adjacent elements, among the non-rotatable element (end wall 32), the plate elements 71 to 75 and the rotatable element (second portion 66), so as to restrict an amount of relative rotation between the adjacent elements. The rotation angle restriction mechanism 14 includes a plurality of friction plates 91 to 96 and a protruding portion 701. The friction plates 91 to 96 serve as a plurality of friction application elements each of which applies friction resistance to relative rotation between the adjacent elements. The protruding portion 701 serves as an axial movement restricting element that restricts the amount of movement of each of the plate elements 71 to 75 in the axial direction Xl to a predetermined amount so as to restrict inclination of each of the plate elements 71 to 75.

Figure 6A:
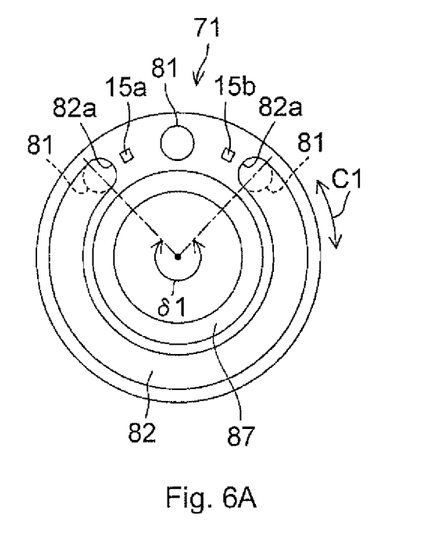
FIG. 6A is a front view of the plate element, for illustrating a movement range of a protrusion that engages with an engagement groove of the plate element at which strain gauges are arranged.
Figure 6B:
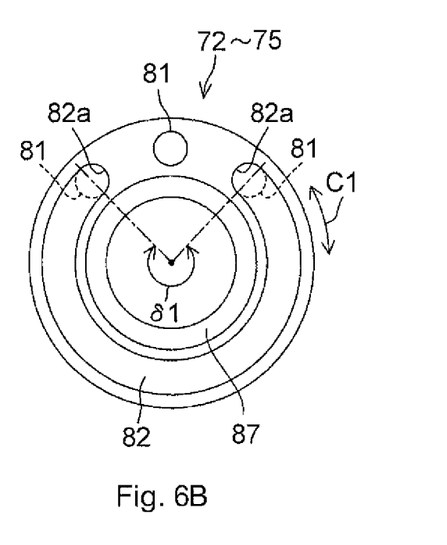
FIG. 6B is a front view of each plate element, for illustrating a movement range of a corresponding protrusion that engages with an engagement groove of the plate element at which no strain gauge is arranged.
Figure 6C:
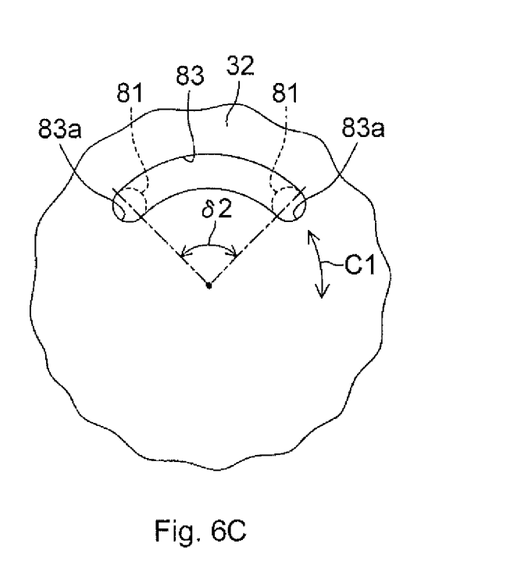
FIG. 6C is a front view of the plate element, for illustrating a movement range of a protrusion that engages with an engagement groove of an end wall that serves as a non-rotatable element.

As shown in FIG. 3 and FIG. 4, each of the coupling elements 80 is formed of a pin-shaped protrusion 81 and a closed-end engagement groove 82 or closed-end engagement groove 83. The protrusion 81 is provided at one of the corresponding adjacent elements, and protrudes in the axial direction X1. The engagement groove 82 or engagement groove 83 is formed in the other one of corresponding adjacent elements such that the protrusion 81 engages with the engagement groove 82 or engagement groove 83, and extends in the circumferential direction C1. As shown in FIG. 6A, FIG. 6B and FIG. 6C, each of the protrusions 81 engages with one of restricting portions 82a or one of restricting portions 83a, which are respective ends of a corresponding one of the engagement grooves 82, 83. Thus, an amount of relative rotation between any adjacent elements is restricted.

As shown in FIG. 3 and FIG. 4, each of the plate elements 71 to 75 is formed of an annular plate, and is arranged between the first portion 65 and the output shaft 24. The plate elements 72 to 75 are formed of common members, and the plate element 71 differs from the remaining plate elements 72 to 75 in that the strain gauges 15a, 15b that serve as the steering direction detection unit are arranged. The plate elements 71 to 75 are supported on an outer periphery 85a of a tubular member 85 (for example, a plain bearing, such as a metal bush) so as to be rotatable about a first rotation center L1 and axially movable. The tubular member 85 is fitted to the outer periphery of the output shaft 24 so as to be rotatable together with the output shaft 24. The plate elements 71 to 75 are rotatable relative to the output shaft 24 and the first portion 65.

The protrusion 81 is formed on one end face of each of the plate elements 71 to 75 so as to protrude therefrom, and the engagement groove 82 is formed so as to extend in the circumferential direction C1 in a region in which the protrusion 81 is not formed. The end wall 32 (non-rotatable element) of the housing 11 has the closed-end engagement groove 83 that extends in the circumferential direction C1.

Figure 5:
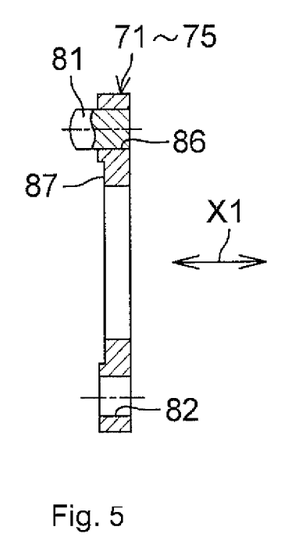
FIG. 5 is a sectional view of each of plate elements of the rotation angle restriction mechanism.

As shown in FIG. 5, each of the protrusions 81 is formed separately from a corresponding one of the plate elements 71 to 75, and part of each of the protrusions 81 is inserted and fixedly fitted in a fixing hole 86 of a corresponding one of the plate elements 71 to 75. Each protrusion 81 may be formed integrally with the corresponding one of the plate elements 71 to 75 from a single material. An annular receiving recess 87 is formed in at least one end face (end face from which each of the protrusions 81 protrudes in the present embodiment) of each of the plate elements 71 to 75.

As shown in FIG. 4, each receiving recess 87 receives a corresponding one of the friction plates 92 to 96. In addition, the outer periphery of each of the friction plates 92 to 96 is rotatably supported by the peripheral wall face of the corresponding one of the receiving recesses 87. In addition, an annular receiving recess 88 is formed in the second portion 66 of the rotor core 63 of the rotor 61. The outer periphery of the friction plate 91 is rotatably supported by the peripheral wall face of the receiving recess 88.

As shown in FIG. 3 and FIG. 4, the protrusion 81 formed at the second portion 66 (rotatable element) is fitted in the closed-end engagement groove 82 formed in the plate element 71 so as to be slidable in the circumferential direction C1. In addition, the protrusions 81 respectively formed on the plate elements 71 to 74 are respectively slidably fitted in the corresponding engagement grooves 82 respectively formed in the adjacent plate elements 72 to 75. The protrusion 81 formed on the plate element 75 is slidably fitted in the engagement groove 83 formed in the end wall 32 (non-rotatable element) of the housing 11.

As shown in FIG. 6A and FIG. 6B, the range in which the engagement groove 82 is arranged in the circumferential direction C1 may be set as follows: the movement range of each protrusion 81 that engages with the engagement groove 82 of a corresponding one of the plate elements 71 to 75 (range in which the protrusion 81 moves between the restricting portions 82a at respective ends of the engagement groove 82) is formed such that the relative rotation angle between the adjacent elements becomes δ1. As shown in FIG. 6C, the range in which the engagement groove 83 is arranged in the circumferential direction C1 may be set as follows: the movement range of the protrusion 81, which engages with the engagement groove 83 of the end wall 32 (non-rotatable element) (range in which the protrusion 81 moves between the restricting portions 83a at respective ends of the engagement groove 83) is formed such that the relative rotation angle between the adjacent elements becomes δ2.

In this case, a maximum rotation angle δmax of the steering shaft 9 is obtained as follows.

$$\delta max = \delta 1 \times 5 + \delta 2$$

Therefore, it is possible to restrict the rotation amount of the steering shaft 9 to a desired multiple rotation range. For example, when δ1 is 306° and δ2 is 90°, the rotation amount of the steering shaft 9 is restricted within 1620° (predetermined angle).

The plate elements 71 to 75 are the common ones, and the arrangement range of the engagement groove 83 of the end wall 32 is made different from the arrangement range of each of the engagement grooves 82 of the plate elements 71 to 75. Thus, it is possible to easily set the restriction range of the rotation amount of the steering shaft 9 while achieving cost reduction. Note that, δ1 may be equal to δ2.

As shown in FIG. 6A, the strain gauges 15a, 15b, which serve as the steering direction detection unit, are arranged on the end face of the plate element 71, the end face being on the side on which the protrusion 81 formed on the plate element 71 protrudes. The strain gauge 15a is arranged near one of the restricting portions 82a of the engagement groove 82 of the plate element 71, and the strain gauge 15b is arranged near the other one of the restricting portions 82a of the engagement groove 82 of the plate element 71.

In the event of a failure, that is, in a case where a malfunction occurs in the steering angle sensor 12, when the rotation angle restriction mechanism 14 reaches one of the terminal ends of the restricted angular range through operation of the steering member 2, the protrusion 81 engages with one of the restricting portions 82a of the engagement groove 82 of the plate element 71. Thus, in the plate element 71, a strain occurs near the one of the restricting portions 82a, and the strain gauge 15a detects the strain. Thus, the ECU 18 detects the steering direction, and determines, for example, that steering to the left is performed.

In addition, in the event of a failure, that is, in a case where a malfunction occurs in the steering angle sensor 12, when the rotation angle restriction mechanism 14 reaches the other one of the terminal ends of the restricted angular range through operation of the steering member 2, the protrusion 81 engages with the other one of the restricting portions 82a of the engagement groove 82 of the plate element 71. Thus, in the plate element 71, a strain occurs near the other one of the restricting portions 82a, and the strain gauge 15b detects the strain. Thus, the ECU 18 detects the steering direction, and determines, for example, that steering to the right is performed.

As shown in FIG. 3 and FIG. 4, each of the friction plates 91 to 96 is interposed between corresponding two adjacent elements such that friction resistance against relative rotation between the corresponding two adjacent elements is applied to the corresponding two adjacent elements. For example, the friction plate 91 is interposed between the second portion 66 (rotatable element) and the plate element 71, and applies friction resistance against the relative rotation between the elements 66, 71 to the elements 66, 71. The friction plates 92 to 95 are respectively interposed between the adjacent plate elements 71, 72, between the adjacent plate elements 72, 73, between the adjacent plate elements 73, 74 and between the adjacent plate elements 74, 75, and apply friction resistance against relative rotation between the corresponding adjacent two of the plate elements 71 to 75 to the corresponding adjacent two of the plate elements 71 to 75. The friction plate 96 is interposed between the plate element 75 and the pressing plate 70, and applies friction resistance against relative rotation between the plate element 75 and the pressing plate 70 to the plate element 75 and the pressing plate 70.

As shown in FIG. 3, the urging member 69 and the pressing plate 70 are accommodated and retained in the annular recess 44 of the inner wall face 32a of the end wall 32 of the housing 11. The urging member 69 and the pressing plate 70 each have an annular shape, and surround the output shaft 24. For example, a wave washer is used as the urging member 69. The urging member 69 is interposed between a bottom 44a of the annular recess 44 and the pressing plate 70.

The pressing plate 70 has, for example, an annular protruding portion 701 that serves as an axial movement restricting element and that protrudes from its outer periphery in the axial direction. The annular protruding portion 701 is formed integrally with the pressing plate 70 from a single material. The outer periphery of the annular protruding portion 701 is supported by a peripheral wall face 44b of the annular recess 44 so as to be movable in the axial direction X1. The annular protruding portion 701 surrounds the urging member 69 formed of the wave washer.

The urging member 69 elastically urges the pressing plate 70 toward the friction plate 96. Thus, the urging member 69 elastically holds a laminated unit between the pressing plate 70 (non-rotatable element) and the second portion 66 (rotatable element) of the rotor 61. The laminated unit includes the plate elements 71 to 75 and the friction plates 91 to 96. The friction plates 91 to 96 serve as the friction resistance application elements. That is, the urging member 69 collectively applies an axial preload to the plate elements 71 to 75 and friction plates 91 to 96 of the laminated unit. Thus, the friction plates 91 to 96 are set so as to be able to apply friction resistance having a desired magnitude to members that contact with the friction plates 91 to 96.

In addition, in a state where the laminated unit that includes the plate elements 71 to 75 and the friction plates 91 to 96 that serve as the friction resistance application elements is pressed toward the second portion 66 of the rotor 61, a clearance S is formed between the protruding portion 701 and the end wall 32 (specifically, the bottom 44a of the annular recess 44). The amount of the clearance S is set to a predetermined amount (for example, 0.1 mm).

Figure 7:
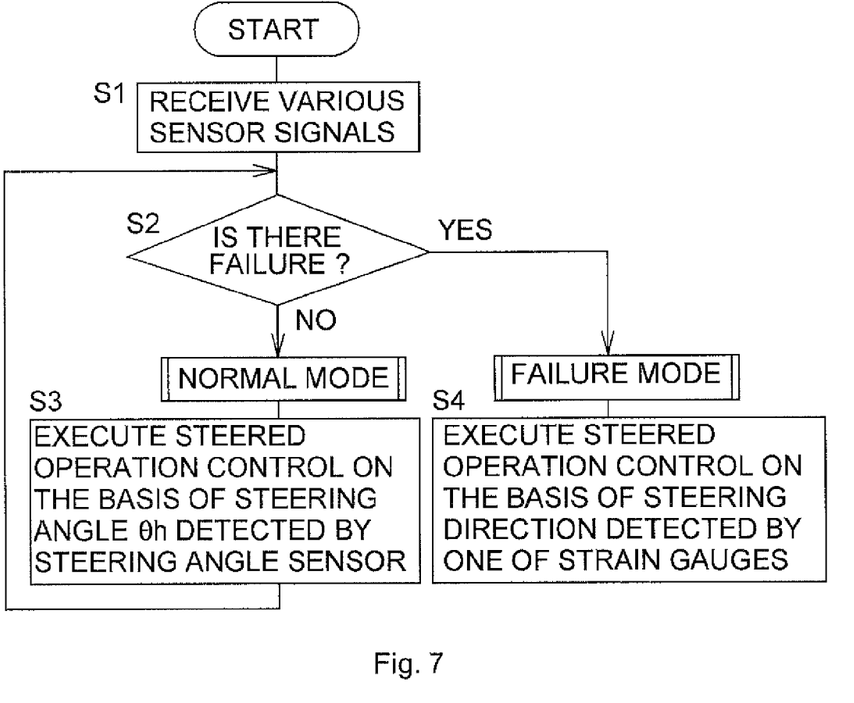
FIG. 7 is a flowchart that shows the flow of main control that is executed by an ECU.

Next, FIG. 7 is a flowchart that shows the flow of control that is executed by the ECU 18 in association with steered operation control. When a system is activated, first, signals from the various sensors are input into the ECU 18 in step S1. Then, it is determined in step S2 whether there is a failure (malfunction in the steering angle sensor 12) on the basis of the signal from the steering angle sensor 12.

When there is no failure NO in step S2), the process shifts into a normal mode. In the normal mode, drive control (steered operation control) is executed on the steered system actuator 4 on the basis of the steering angle Oh detected by the steering angle sensor 12 (step S3). When there is a failure (YES in step S2), the process shifts into a failure mode. In the failure mode, on the basis of the steering direction detected by the strain gauge 15a (or strain gauge 15b), drive control (steered operation control) is executed on the steered system actuator 4 such that the steered system actuator 4 is driven in the corresponding steered direction while the value detected by one of the strain gauges 15a, 15b is larger than or equal to a predetermined value (step S4).

According to the present embodiment, in the event of a failure, that is, in a case where a malfunction occurs in the steering angle sensor 12, when the steering member 2 is steered and reaches one of the terminal ends of the restricted angular range, which corresponds to the steering direction, a strain occurs in the rotation angle restriction mechanism 14. The steering direction detection unit (strain gauges 15a, 15b) detects the strain to detect the steering direction. By executing drive control on the steered system actuator 4 on the basis of the detected steering direction, it is possible to perform steering, thereby achieving fail safe. Because the simple and inexpensive strain gauges 15a, 15b are used as the steering direction detection unit, it is possible to reduce manufacturing cost.

The ECU 18 is able to easily detect the steering direction on the basis of binary determination as to whether a value output from one of the strain gauges 15a, 15b exceeds a predetermined value. In addition, adjacent elements among the non-rotatable element (end wall 32), the rotatable element (second portion 66) and the plate elements 71 to 74 of the rotation angle restriction mechanism 14 are coupled by the corresponding coupling element 80 such that the amount of relative rotation between the adjacent elements is restricted. Therefore, regardless of which of the non-rotatable element (end wall 32), the rotatable element (second portion 66) and the plate elements 71 to 75 has the strain gauges 15a, 15b, it is possible to detect the steering direction by detecting a strain at the terminal ends of the restricted angular range.

When the restricted portion (protrusion 81) engages with one of the corresponding restricting portions 82a (the terminal ends of the engagement groove 82), a strain occurs in each of the element at which the restricted portion (protrusion 81) is provided (the second portion 66 that serves as the rotatable element) and the element in which the restricting portions 82a are formed (the plate element 71). A strain in one of the element at which the restricted portion (protrusion 81) is provided (the second portion 66 that serves as the rotatable element) and the element in which the restricting portions 82a are formed (the plate element 71) needs to be detected by the strain gauges 15a, 15b.

In the present embodiment, the strain gauges 15a, 15b are arranged at the plate element 71 in which the restricting portions 82a are formed, and a strain that occurs in the plate element 71 is detected.

The non-rotatable element (end wall 32) and the rotatable element (second portion 66) are arranged on respective sides of the plate elements 71 to 75, which are coaxially supported by the rotary shaft (output shaft 24) of the steering member 2, in the axial direction X1. Therefore, it is possible to arrange the elements of the rotation angle restriction mechanism 14 in a compact space, and it is possible to achieve a reduction in size. In addition, by accommodating the reaction motor 10 that applies steering reaction force to the steering member 2 and the rotation angle restriction mechanism 14 inside the same housing 11, it is possible to achieve simplification of the structure and a reduction in size in the steer-by-wire vehicle steering system 1.

Figure 8:
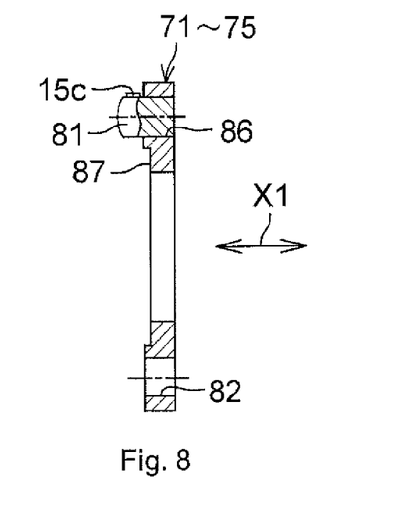
FIG. 8 is a sectional view of a plate element at which a strain gauge of a rotation angle restriction mechanism is arranged in another embodiment of the invention.

In the above-described embodiment, the strain gauges 15a, 15b are arranged at the plate element 71. Alternatively, the strain gauges may be arranged at any one of the other plate elements 72 to 75. As shown in FIG. 8, a strain gauge 15c may be arranged at any element (for example, the plate element 71) at which the protrusion 81 that serves as the restricted portion is provided. In this case, the only one strain gauge 15c needs to be arranged at the protrusion 81 or near the protrusion 81. Therefore, it is possible to simplify the structure. The sign of the value output from the strain gauge 15c varies depending on which one of the restricting portions 82a the protrusion 81 contacts. Therefore, it is possible to detect the steering direction.

Figure 9:
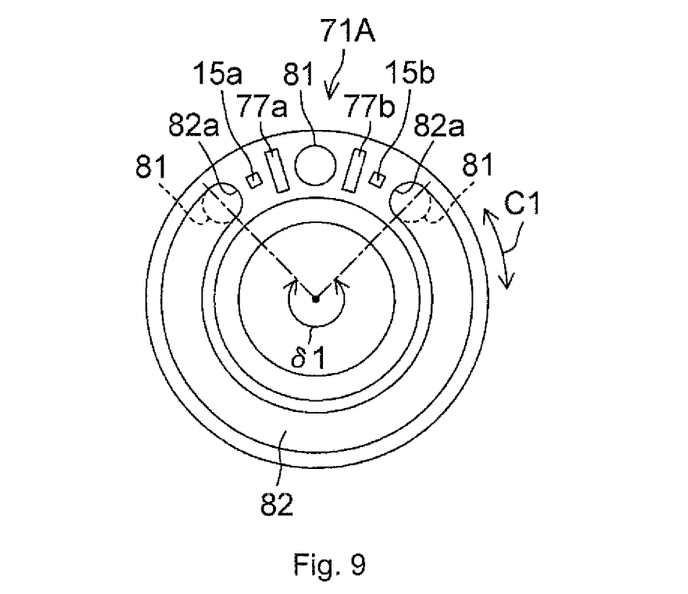
FIG. 9 is a front view of a plate element at which strain gauges and lightening portions are arranged in another embodiment of the invention.

As shown in FIG. 9, at a plate element 71A that is the element at which the strain gauges 15a, 15b are arranged, lightening portions 77a, 77b may be formed near the strain gauges 15a, 15b, respectively. In this case, by forming the lightening portions 77a, 77b near the strain gauges 15a, 15b, respectively, it is possible to increase the amount of strain near each of the strain gauges 15a, 15b. Thus, it is possible to reliably detect a strain, thereby improving the detection accuracy.

Figure 10:
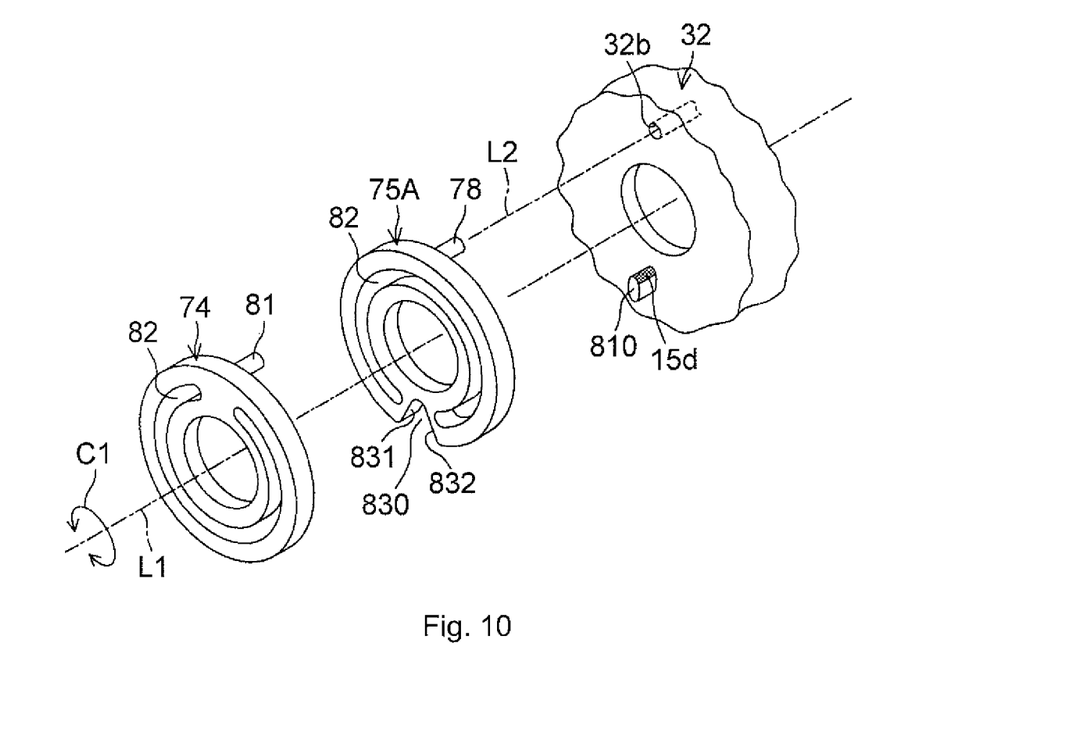
FIG. 10 is an exploded perspective view of an end wall that serves as a non-rotatable element and some of plate elements according to another embodiment of the invention.

Next, FIG. 10 shows another embodiment of the invention. As shown in FIG. 10, a plate element 75A, which is one of the endmost plate elements (in the axial direction X1) and which faces the end wall 32 that serves as the non-rotatable element, is supported by the end wall 32 so as to be rotatable about a second rotation center L2 that is offset from the first rotation center L1. The first rotation center L1 is the rotation center of each of the remaining plate elements 71 to 74 except the plate element 75A which is one of the endmost plate elements, and corresponds to the central axis of the output shaft 24 that serves as the rotary shaft of the steering member 2.

A support shaft 78 that protrudes from the end face of the plate element 75A that faces the end wall 32 is rotatably fitted to a support hole 32b formed in the inner wall face 32a of the end wall 32. The second rotation center L2 corresponds to the central axis of the support shaft 78. In addition, a protrusion 810 that serves as a restricted portion and that protrudes from the end wall 32 toward the plate element 75A is accommodated in a recess 830 formed in the plate element 75A so as to be engageable with a predetermined play in the circumferential direction C1. The engagement groove 82 with which the protrusion 81 of the adjacent plate element 74 engages is formed in the plate element 75A.

A pair of restricting portions 831, 832 is formed within the recess 830 at the respective terminal ends of the restricted angular range. The protrusion 810 contacts one of the restricting portions 831, 832 as the plate element 75A eccentrically oscillates. A strain gauge 15d that serves as the steering direction detection unit is arranged on the side face of the protrusion 810. Because the direction in which the protrusion 810 deforms is different between the case where the protrusion 810 contacts the restricting portion 831 and the case where the protrusion 810 contacts the restricting portion 832, the sign of the value output from the strain gauge 15d varies depending on whether the protrusion 810 contacts the restricting portion 831 or the restricting portion 832. As a result, it is possible to detect the steering direction even with the use of the single strain gauge 15d.

According to the present embodiment, the plate element 75A, which is one of the endmost plate elements and which faces the non-rotatable element (end wall 32), rotates eccentrically with respect to the remaining plate elements 71 to 74. This restricts the amount of relative rotation between the non-rotatable element (end wall 32) and the plate element 75A which is one of the endmost plate elements. Therefore, it is possible to detect a strain with the use of the strain gauge 15d arranged at one of the non-rotatable element (end wall 32) and the plate element 75A which is one of the endmost plate elements (in the present embodiment, the protrusion 810 provided at the plate element 75A).

Figure 11A:
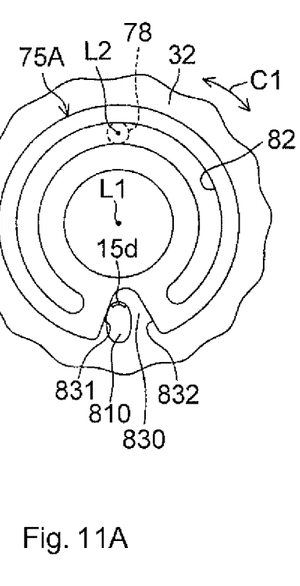
Figure 11B:
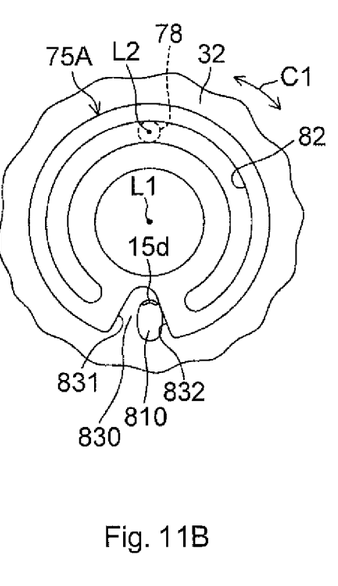

That is, the plate element 75A, which is one of the endmost plate elements and which faces the non-rotatable element (end wall 32), rotates eccentrically with respect to the remaining plate elements 71 to 74. Thus, at one of the terminal ends of the restricted angular range, the protrusion 810 that serves as the restricted portion contacts the restricting portion 831 in the recess 830 as shown in FIG. 11A, and, at the other one of the terminal ends of the restricted angular range, the protrusion 810 that serves as the restricted portion contacts the restricting portion 832 in the recess 830 as shown in FIG. 11B.

Thus, the amount of relative rotation between the non-rotatable element (end wall 32) and the plate element 75A which is one of the endmost plate elements is restricted. Therefore, it is possible to detect a strain with the use of the strain gauge 15d arranged at the protrusion 810 provided at the plate element 75A. In the embodiment shown in FIG. 10, instead of the strain gauge 15d provided at the protrusion 810, strain gauges may be respectively provided at the restricting portions 831, 832.

Figure 12A:
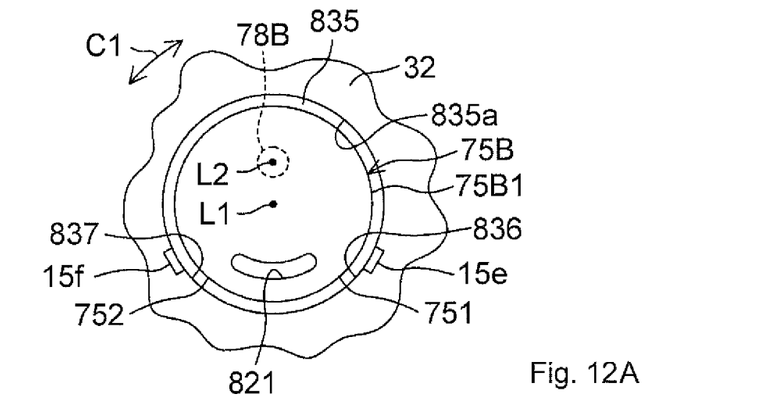
Figure 12B:
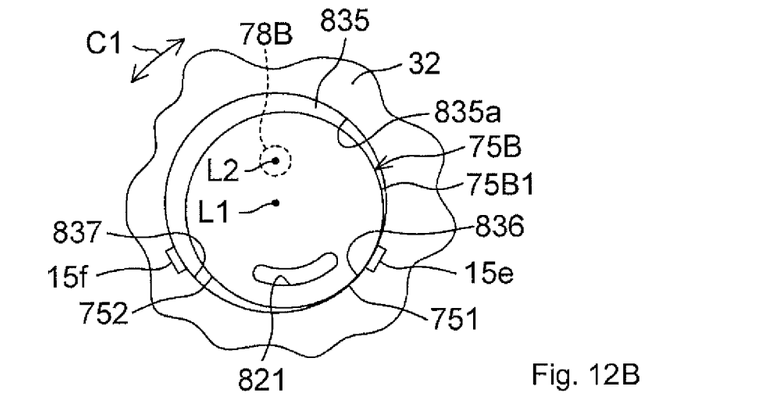
Figure 12C:
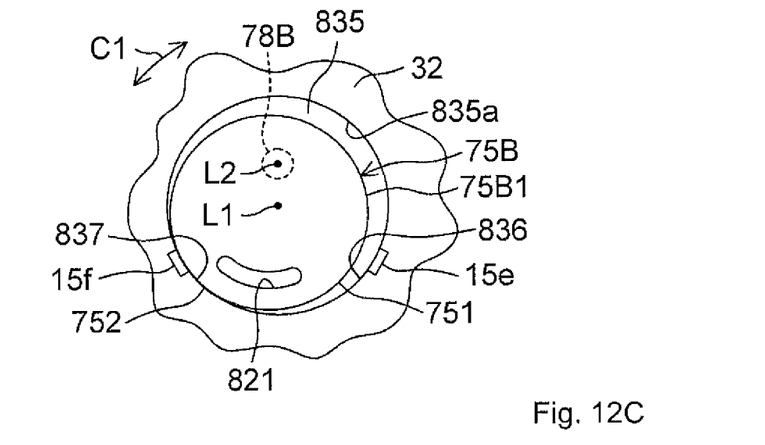

Next, FIG. 12A to FIG. 12C show further another embodiment of the invention. As shown in FIG. 12A, the present embodiment differs from the embodiment shown in FIG. 10 in the following point. That is, a plate element 75B which is one of the endmost plate elements is accommodated in an annular recess 835 formed in the end wall 32 that serves as the non-rotatable element so as to be engageable with a play in the circumferential direction C1.

A circular columnar support shaft 78B that protrudes from the plate element 75B is fitted in a circular support hole of the end wall 32, and the plate element 75B is supported so as to be rotatable about the second rotation center L2 that is the central axis of the support shaft 78B. That is, the central axis of the support shaft 78B coincides with the second rotation center L2 that is the rotation center of the plate element 75B which is one of the endmost plate elements, and the second rotation center L2 is offset from the first rotation center L1 of the remaining plate elements 71 to 74. The protrusion 81 that protrudes from the adjacent plate element 74 is engaged with an engagement groove 821 formed in the plate element 75B.

A pair of restricting portions 836, 837 is formed on an inner periphery 835a of the annular recess 835, and part of an outer periphery 75B1 of the plate element 75B constitutes restricted portions 751, 752. On the inner periphery 835a of the annular recess 835, a pair of strain gauges 15e, 15f that serve as the steering direction detection unit is arranged. The strain gauges 15e, 15f are respectively arranged at the restricting portions 836, 837 or near the restricting portions 836, 837.

According to the present embodiment, the plate element 75B, which is one of the endmost plate elements and which faces the non-rotatable element (end wall 32), rotates eccentrically with respect to the remaining plate elements 71 to 74. Thus, at one of terminal ends of the restricted angular range, as shown in FIG. 12B, the corresponding restricted portion 751 contacts the restricting portion 836, and the strain gauge 15e detects a strain that occurs in the restricting portion 836. On the other hand, at the other one of the terminal ends of the restricted angular range, as shown in FIG. 12C, the corresponding restricted portion 752 contacts the restricting portion 837, and the strain gauge 15f detects a strain that occurs in the restricting portion 837.

Thus, the amount of relative rotation between the non-rotatable element (end wall 32) and the plate element 75B, which is one of the endmost plate elements, is restricted. Therefore, it is possible to detect a strain with the use of a corresponding one of the strain gauges 15e, 15f arranged on the inner periphery 835a of the annular recess 835 of the end wall 32. In the embodiment of FIG. 12A to FIG. 12C, instead of the strain gauges 15e, 15f respectively provided at the restricting portions 836, 837, a pair of strain gauges respectively provided at the restricted portions 751, 752 may be used.

The invention is not limited to the above-described embodiments. For example, in the above-described embodiment, the inner peripheries of the plate elements 71 to 75 are supported by the outer periphery of the tubular member 85 fitted to the outer periphery of the steering shaft 9 (output shaft 24). Alternatively, the inner peripheries of the plate elements 71 to 75 may be directly supported by the steering shaft 9 (output shaft 24).

Each friction resistance application element may be a friction layer that coats at least one of facing surfaces of adjacent elements.

The urging member 69 and the pressing plate 70 may be interposed between the second portion 66 that serves as the rotatable element and the plate element 71. The plate elements 71 to 75 may be retained by a plain bearing retained on the inner periphery of the first portion 65 of the rotor 61. Other than the above, various modifications may be made within the scope of the appended claims.

What is claimed is:

1. A vehicle steering system in which a steering member, which is operated in multiple rotations, and a steered wheel are not mechanically coupled to each other, the vehicle steering system comprising:
    a steering angle sensor that detects a steering angle of the steering member;
    a steering direction detection unit that detects only a steering direction of the steering member;
    a steered system actuator that drives the steered wheel;
    a rotation angle restriction mechanism that restricts a rotation angle of the steering member within a restricted angular range; and
    a control unit that has a normal mode in which drive control is executed on the steered system actuator based on the steering angle detected by the steering angle sensor and a failure mode in which, when there is a malfunction in the steering angle sensor, drive control is executed on the steered system actuator based on the steering direction detected by the steering direction detection unit, wherein
    the steering direction unit includes a strain gauge that detects the steering direction by detecting a strain that occurs in the rotation angle restriction mechanism at any one of a pair of terminal ends of the restricted angular range,
    the rotation angle restriction mechanism includes: a rotatable element that is coaxially rotatable together with a rotary shaft of the steering member; a non-rotatable element that faces the rotatable element in an axial direction of the rotary shaft; a plurality of plate elements that are interposed between the rotatable element and the non-rotatable element and that are coaxially rotatable with respect to the rotary shaft; and a plurality of coupling elements, each of which couples adjacent elements among the non-rotatable element, the plurality of plate elements, and the rotatable element so as to restrict an amount of relative rotation between the adjacent elements; and
    the strain gauge that serves as the steering direction detection unit is arranged at one element among the non-rotatable element, the rotatable element, the plurality of plate elements and the plurality of coupling elements, and detects a strain that occurs in the one element.

2. The vehicle steering system according to claim 1, wherein:
    each of the plurality of coupling elements includes: a restricted portion that is provided at a first one of the adjacent elements; and a pair of restricting portions that are formed in a second one of the adjacent elements and that selectively engage with the restricted portion at the corresponding terminal ends of the restricted angular range; and
    the element at which the strain gauge is arranged is one of the element at which the restricted portion is provided and the element that has the pair of restricting portions.

3. The vehicle steering system according to claim 2, wherein:
    the plate element, which is one of endmost plate elements and which faces the non-rotatable element, is supported by the non-rotatable element so as to be rotatable about a second rotation center that is offset from a first rotation center that is a rotation center of the remaining plate element, other than the plate element which is the one of the endmost plate elements, among the plurality of plate elements; and
    the element at which the strain gauge is arranged is one of the non-rotatable element and the plate element which is the one of the endmost plate elements.

4. The vehicle steering system according to claim 3, wherein:
    a protrusion that serves as the restricted portion provided at one of the non-rotatable element and the plate element which is the one of the endmost plate elements is accommodated in a recess formed in the other one of the non-rotatable element and the plate element which is the one of the endmost plate elements so as to be engageable with a predetermined play in a circumferential direction; and
    the pair of restricting portions is formed within the recess.

5. The vehicle steering system according to claim 3, wherein:
    the plate element which is the one of the endmost plate elements is accommodated in an annular recess formed in the non-rotatable element so as to be engageable with a play in a circumferential direction;

the pair of restricting portions is formed on an inner periphery of the annular recess; and a pair of the restricted portions is formed on an outer periphery of the plate element which is the one of the endmost plate elements.

6. The vehicle steering system according to claim 1, wherein a lightening portion is formed near the strain gauge in the element at which the strain gauge is arranged.

* * * * *